3,450,703
Patented June 17, 1969

---

3,450,703
2-OXO- OR THIO-4-HYDROXY-ALKYL-HEXAHYDROPYRIMIDINES
Harro Petersen, Mannheim, Germany, assignor to Badische Anilin- & Soda-Fabrik Aktiengesellschaft, Ludwigshafen (Rhine), Germany
No Drawing. Filed July 12, 1966, Ser. No. 564,529
Claims priority, application Germany, July 22, 1965, B 82,984; May 25, 1966, B 87,289; May 27, 1966, B 87,332; June 15, 1966, B 87,566
Int. Cl. C07d 51/18
U.S. Cl. 260—251      4 Claims

---

ABSTRACT OF THE DISCLOSURE

Hexahydropyrimidines of Formula IV, below, where $R^1$ and $R^2$ are H or 1–8 carbon alkyl, $R^3$ and $R^4$ are 1–4 carbon alkyl, $R^5$ is H or 1–2 carbon alkyl, and X is O or S; intermediates to produce slow acting nitrogen fertilizers, i.e., ureidohexahydropyrimidones.

---

This invention relates to new and valuable hexahydropyrimidine derivatives and to the production of these new substances.

It is known that water-insoluble substances consisting of polymethylenureas having different molecular weights are formed in the reaction of one mole of urea and one mole of formaldehyde in the presence of acids. Reaction of higher aldehydes, for example acetaldehyde or butyraldehyde, with urea in the molar ratio 1:1 at a pH value of from about 4 to 7 and at moderately raised temperature also results in condensation products having a structure analogous to the polymethylenureas.

It is an object of this invention to provide a method of making new hexahydropyrimidines. Another object of the invention is to provide the new compounds obtainable by the said method.

These objects are achieved by reacting a urea having the General Formula I:

in which $R^1$ and $R^2$ denote hydrogen atoms or alkyl groups and X denotes an oxygen or sulfur atom, with an aldehyde having the General Formula II:

in which $R^3$ and $R^4$ denote alkyl groups, and an aldehyde having the General Formula III:

in which $R^5$ denotes a hydrogen atom or a methyl or ethyl radical, in a molar ratio of about 1:1:1 with the addition of acid at elevated temperature. The process may be carried out in the presence of inert solvents or suspension agents.

In preferred starting materials having the Formula I, $R^1$ and $R^2$ denote hydrogen atoms or alkyl groups having one to eight, preferably one to four, carbon atoms, and X denotes oxygen or sulfur. It is thus possible to use not only urea and thiourea but also their monosubstituted and symmetrically disubstituted derivatives, such as N-methylurea, N-ethylurea, N-propylurea, N-octylurea, N-methyl-N′-propylurea, N,N′-dimethylurea and N,N′-dipropylurea and the corresponding thioureas.

In the preferred starting materials having the Formula II, the radicals $R^3$ and $R^4$ denote alkyl groups having one to four carbon atoms. Examples of suitable aldehydes are isobutyraldehyde, 2-ethylhexanal and 2-methylpentanal. It is preferred to use isobutyraldehyde.

Formaldehyde, acetaldehyde and propionaldehyde are the starting materials having the Formula III.

The aldehydes and the urea are advantageously used in a molar ratio of 1:1:1. Slight deviations therefrom, for example of up to 20 mole percent, are possible.

The reaction is carried out with the addition of acid. The acids may be strong inorganic or organic acids, i.e. those having a dissociation constant of at least $10^{-2}$, which are not oxidized under the reaction conditions. For example halogen hydracids, particularly dry hydrogen chloride, concentrated hydrochloric acid, hydrogen bromide, hydrobromic acid, sulfuric acid, oxalic acid, benzenesulfonic acid or toluenesulfonic acid may be used. When aqueous acids are used, they should advantageously contain at least 5% by weight of acid. The acids are as a rule used in amounts of 3 to 50% by weight, preferably 5 to 20% by weight, on the amount of urea used.

It is advantageous to carry out the reaction in the presence of inert solvents and/or diluents, such as water, diethyl ether, dioxane, dimethylsulfoxide or dimethylformamide. The solvents and/or diluents may be used singly or mixed.

The reaction may be carried out for example by adding the whole amount of acid to the mixture of the starting materials while stirring, if necessary while cooling and if desired in the presence of a solvent, and then heating the reaction mixture to temperatures of from 30° to 110° C., preferably from 50° to 80° C.

The process according to this invention involves a condensation reaction in which water is eliminated. The elimination of water may be accelerated by adding more acid, if necessary while raising the reaction temperature, but in many cases it is possible to obtain the desired product at low temperatures in the presence of large amounts of acid. On the other hand it is also possible to carry out the reaction at higher temperatures in the presence of less acid. The temperature chosen will depend on the reactants and may be lower when the amount of acid added is increased, and vice versa.

It is also possible however to add only a portion of the acid to be used, for example 0.5 to 10% by weight thereof, so that polyalkylenureas are formed and then converting these condensates into the 4-hydroxyhexahydropyrimidinones or 4-hydroxyhexahydropyrimidine-thiones with the addition of further acid, if necessary with heating.

The preferred new compounds which can be prepared according to this invention have the following general formula:

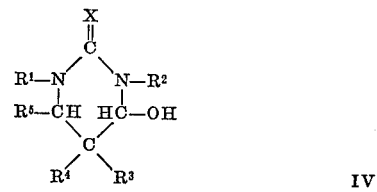

in which $R^1$ and $R^2$ denote hydrogen atoms or alkyl groups having one to eight, preferably one to four, carbon atoms, $R^3$ and $R^4$ denote alkyl radicals having one to four carbon atoms, $R^5$ denotes a hydrogen atom or an alkyl radical having one or two carbon atoms and X denotes an oxygen or sulfur atom.

The new substances having the General Formula IV are valuable intermediates. For example by reaction of 5,5-dimethyl-4-hydroxyhexahydropyrimidinone-(2) with urea at temperatures of from 50° to 70° C. in the presence of acid, 5,5-dimethyl-4-ureidohexahydropyrimidinone-(2) is obtained which may be used as a slow acting nitrogen fertilizer because the compound decomposes only very slowly in the soil. Ureidohexahydropyrimidinones obtained in an analogous way from other compounds having the Formula IV are likewise suitable as slow release fertilizers.

The invention is illustrated by the following examples in which parts are parts by weight.

EXAMPLE 1

50 parts of a 50% sulfuric acid is added while stirring to a mixture of 120 parts of urea, 200 parts of 30% formaldehyde solution, 500 parts of water and 144 parts of isobutyraldehyde. The polycondensation product is precipitated immediately after the addition of acid. Without separating the precipitate deposited, the reaction mixture is heated to refluxing temperature. With continuous reflux cooling, the reflux temperature slowly rises to about 80° to 85° C. At this temperature, the mixture is heated for another three hours and the precipitate passes completely into solution after a short time. The product is then neutralized with caustic soda solution, filtered if necessary and the filtrate evaporated to a weight of 500 parts under subatmospheric pressure. After allowing the whole to stand for one day, the deposited 2-oxo-4-hydroxy-5,5-dimethylhexahydropyrimidine is filtered off and dried. 150 parts of crude product is obtained. The pure product is obtained by recrystallization from water. It has a melting point of 245° to 246° C. with decomposition.

*Analysis.*—$C_6H_{12}O_2N_2$ (144). Found: C, 50.2%; H, 8.5%; O, 22.0%; N, 19.1%. Calculated: C, 50.0%; H, 8.4%; O, 22.2%; N, 19.4%.

EXAMPLE 2

20 parts of concentrated hydrochloric acid is added while stirring to a mixture of 88 parts of symmetrical dimethylurea, 100 parts of 30% formaldehyde solution and 72 parts of isobutyraldehyde. The reaction temperature rises to 70° C. after a short time. After the reaction solution has been stirred for an hour at 70° to 80° C., it is neutralized at room temperature with caustic soda solution and concentrated under subatmospheric pressure. The syrup which remains crystallizes after a short time. 160 parts of 1,3-dimethyl-4-hydroxy-5,5 - dimethylhexahydropyrimidinone-(2) is obtained as a crude product. The reaction product may be recrystallized from ethyl acetate. A recrystallized sample melts at 93° C.

*Analysis.*—$C_8H_{16}O_2N_2$ (172). Found: C, 56.0%; H, 9.3%; O, 19.2%; N, 16.1%. Calculated: C, 55.8%; H, 9.3%; O, 18.6%; N, 16.3%.

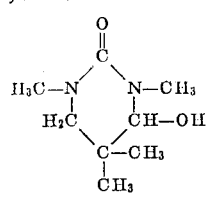

EXAMPLE 3

80 parts of concentrated hydrochloric acid is added while stirring to a mixture of 176 parts of symmetrical dimethylurea, 200 parts of 30% aqueous formaldehyde solution, 256 parts of 2-ethylhexanal and 500 parts of dioxane and the whole heated for four hours at refluxing temperature (90° to 95° C.). The whole is then cooled, neutralized with caustic soda solution, filtered and the filtrate evaporated under subatmospheric pressure. 380 parts of 2-oxo-4-hydroxy-1,3-dimethyl-5-ethyl-5 - butylhexahydropyrimidine is obtained as a syrupy crude product which can be purified by distillation in a high vacuum. It has a boiling point of 188° to 189° C. at 0.1 mm.

*Analysis.*—$C_{12}H_{24}O_2N_2$ (228). Found: C, 63.5%; H, 10.5%; N, 12.5%. Calculated: C, 63.2%; H, 10.5%; N, 12.3%.

I claim:

1. A hexahydropyrimidine having the formula:

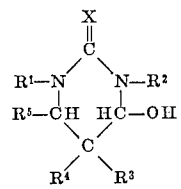

in which $R^1$ and $R^2$ denote hydrogen atoms or alkyl radicals having one to eight carbon atoms, $R^3$ and $R^4$ denote alkyl radicals having one to four carbon atoms, $R^5$ denotes a hydrogen atom or an alkyl radical having one or two carbon atoms, and X denotes an oxygen or sulfur atom.

2. 2-oxo-4-hydroxy-5,5-dimethylhexahydropyrimidine.

3. 2-oxo-1,3,5,5 - tetramethyl - 4 - hydroxyhexahydropyrimidine.

4. 2-oxo-1,3-dimethyl-4-hydroxy-5 - ethyl-5 - n - butylhexahydropyrimidine.

References Cited

UNITED STATES PATENTS 2,887,485   5/1959   Yost _____ 260—251

ALEX MAZEL, *Primary Examiner.*

R. V. RUSH, *Assistant Examiner.*

U.S. Cl. X.R.

71—92